United States Patent
Graham

(10) Patent No.: US 6,519,089 B2
(45) Date of Patent: *Feb. 11, 2003

(54) COLLAPSIBLE LIGHT DIFFUSING DEVICE AND DIFFUSED LIGHTING APPARATUS

(76) Inventor: Martin Charles Graham, 46 Sanderson Road, Jesmond, Newcastle upon Tyne, NE2 2DS (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/554,524
(22) PCT Filed: Nov. 18, 1998
(86) PCT No.: PCT/GB98/03476
§ 371 (c)(1),
(2), (4) Date: May 16, 2000
(87) PCT Pub. No.: WO99/27298
PCT Pub. Date: Jun. 3, 1999

(65) Prior Publication Data

US 2002/0054432 A1 May 9, 2002

(30) Foreign Application Priority Data

Nov. 21, 1997 (GB) .............................. 9724557

(51) Int. Cl.$^7$ .......................... G02B 13/20; G03B 15/02
(52) U.S. Cl. ......................... 359/599; 362/16; 362/17
(58) Field of Search ................................. 359/599, 707, 359/601–615, 408, 481, 808–819, 474; 362/7, 16–18; 348/832–842

(56) References Cited

U.S. PATENT DOCUMENTS

| 4,097,902 A | * | 6/1978 | Curnuck | 348/842 |
| 4,314,280 A | * | 2/1982 | Rose | 348/842 |
| 4,409,646 A | * | 10/1983 | Baliozian | 362/319 |
| 4,490,776 A | * | 12/1984 | Kluch | 362/16 |
| 4,616,293 A | * | 10/1986 | Baliozian | 362/7 |
| 4,669,031 A | * | 5/1987 | Regester | 362/16 |
| 5,311,409 A | * | 5/1994 | King | 362/17 |

* cited by examiner

Primary Examiner—Thong Q. Nguyen
(74) Attorney, Agent, or Firm—Brinks Hofer Gilson & Lione; Daniel B. Schein, Esq.

(57) ABSTRACT

A collapsible light diffusing device includes a collapsible housing having a folded and an unfolded condition. The housing in the unfolded condition defines a first aperture and a second aperture, the second aperture being larger than the first aperture. The housing is adapted to be mounted to a light source such that the first aperture is nearer to the light source than the second aperture. The device further includes a flexible light diffusing member adapted to cover the second aperture when the housing is in the unfolded condition. The housing includes a plurality of substantially rigid panels of heat resistant material, hinged together to enable the housing to be manipulated between the folded and unfolded conditions.

18 Claims, 5 Drawing Sheets

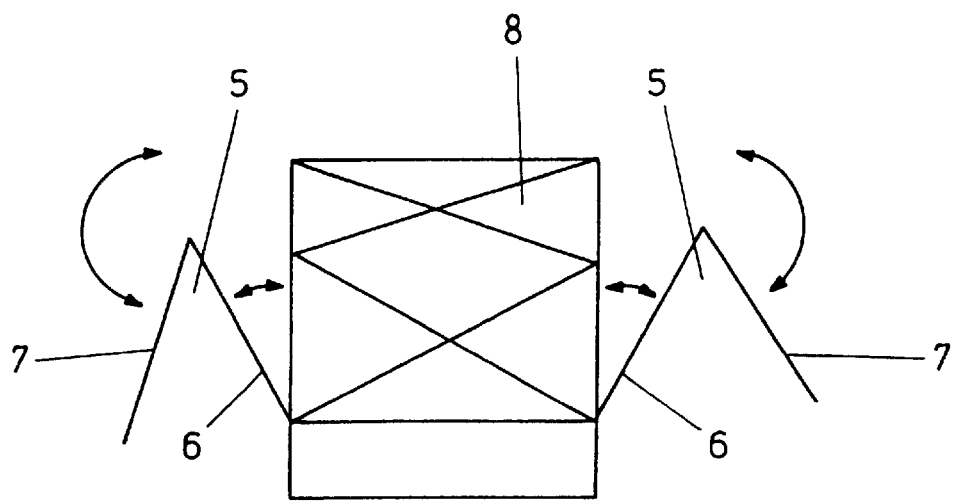
FIG. 7
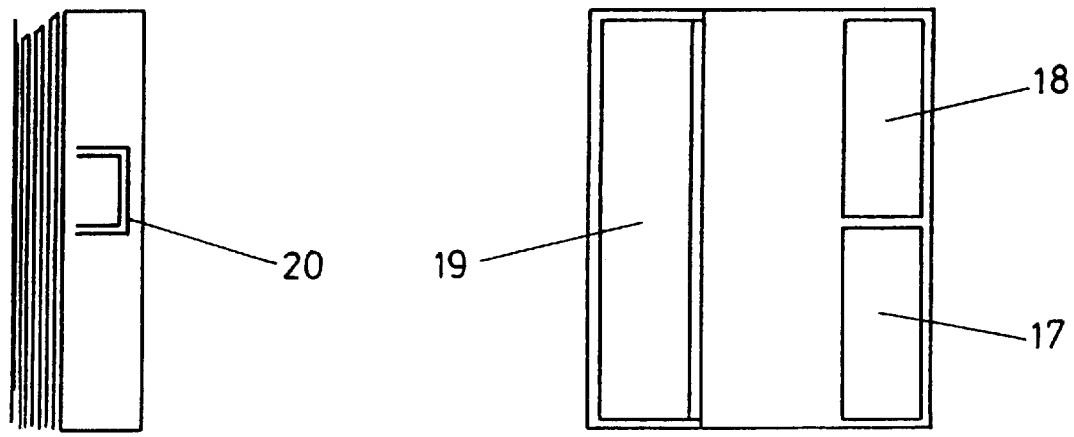
FIG. 8
FIG. 9

COLLAPSIBLE LIGHT DIFFUSING DEVICE AND DIFFUSED LIGHTING APPARATUS

CLAIM FOR PRIORITY

This patent application claims priority under 35 U.S.C. §365 from International Patent Application No. PCT/GB98/03476, filed Nov. 18, 1998, which is incorporated herein by reference for all purposes.

The present invention relates to collapsible light diffusing device and to a diffused lighting apparatus incorporating such a device. The invention relates particularly, but not exclusively, to a device and lighting apparatus for use in television, film and/or video production.

Hard and soft light sources are used for a wide variety of applications in television, film and/or video production. Hard light sources, by which is meant light sources giving relatively clearly defined shadows, are generally fairly small sources in comparison with the object to be illuminated, produce relatively sharp shadows and are relatively compact, since the tungsten filaments and various types of arc lamp which are usually used are fairly compact and naturally produce very hard light.

Soft light sources, on the other hand, by which is meant more diffused light sources, need to be relatively large light sources in relation to the object to be illuminated. Soft light sources are known which are provided by placing a light diffuser between a hard light source and the object to be illuminated.

Though soft lights are by their nature large, it is desirable that these softlights should be as compact as possible for transit and storage since it should be possible to stow the light(s) along with other equipment in a vehicle such as an estate car. In addition, the equipment often must be set up in cramped conditions, for example a domestic kitchen or living room, or a small office.

Collapsible soft light sources are known which comprise a fabric shell and a hard frame of metal rods, together with a light diffuser of fabric. Such light sources are relatively compact when folded and can provide a large soft light source when assembled, but suffer from the disadvantage that the fabric shell and/or diffuser become scorched when exposed to the large amounts of heat generated by a light source, even if the fabric is "flame-proofed". As a result, the light source must either be restricted in power (typically to 1000 Watts or less, although scorching is still not uncommon at such limited powers), or becomes bulky when assembled to allow adequate ventilation. Furthermore, the metal frame can become very hot during operation and requires a lengthy cooling down period, which therefore makes the light source awkward and time consuming to rig and de-rig. These light sources are typically very difficult to colour correct, with any coloured gels being applied to the front surface, which by its nature has a large area.

Preferred embodiments of the present invention seek to overcome the above disadvantages of the prior art.

According to an aspect of the present invention, there is provided a collapsible light diffusing device, the device comprising:

a collapsible housing having a folded and an unfolded condition, the housing in said unfolded condition defining a first aperture and a second aperture, larger than the first aperture, and adapted to be mounted to a light source such that said first aperture is nearer to said light source than said second aperture; and a flexible light diffusing member adapted to cover the second aperture when the housing is in the unfolded condition thereof; wherein the housing comprises a plurality of substantially rigid panels of heat resistant material, the panels being hinged together to enable the housing to be folded between said folded and unfolded conditions.

By providing a collapsible housing formed from substantially rigid panels of heat resistant material, this give the advantage of enabling the housing to define a large diffused light source in the unfolded condition thereof, while minimizing scorching of the flexible light diffusing member by placing only heat resistant materials near to the light source.

The housing between the first and second apertures is preferably substantially light-proof when in the unfolded condition thereof.

This gives the advantage of minimizing escape of light from the device in use, thus maximizing controllability of the light emitted by the device.

The inside surfaces of the housing in use may be mirror finished to minimize light loss.

In a preferred embodiment, at least one said panel is located between the flexible light diffusing member and the components defining the first aperture when the housing is in the folded condition thereof.

This provides the further advantage of minimizing scorching of the flexible light diffusing member when the housing is in the folded condition, thus reducing the de-rigging time of lighting apparatus incorporating the device.

In a preferred embodiment, the housing has a substantially polygonal transverse cross-section in the unfolded condition thereof.

The housing preferably has a substantially octagonal cross-section in the unfolded condition thereof.

This provides the advantage of enabling the housing to have a relatively simple construction, but also to provide a large size difference between the first and second apertures whilst providing a very stable structure.

The first aperture may be substantially rectangular.

The housing preferably comprises four substantially rectangular panels, each of which is hinged to a respective side of said first aperture, and four substantially triangular panels, each of which is arranged between a respective pair of adjacent rectangular panels in the unfolded condition of the housing, and wherein each said triangular panel is hinged along one edge thereof to a respective rectangular panel.

This provides the advantage of enabling a particularly simple construction of the housing.

In a preferred embodiment, two said rectangular panels are each foldable in half and are arranged on opposite sides of said first aperture.

In a preferred embodiment, said panels are made from a carbon fiber composite.

This provides the advantage of enabling a very rigid structure of the housing while maintaining a light weight and assisting in dissipation of heat generated by a light source to which the device is mounted.

Alternatively, said panels may be made of metal.

Each said panel may be provided with a light reflecting surface.

This provides the advantage of maximizing the amount of light directed towards the light diffusing member, thus minimizing the amount of light absorbed by the panels, which would otherwise cause undesirable loss of light and heating of the panels.

The diffusing member may be formed substantially of fabric.

The diffusing member may be removably mounted to the housing.

This provides the advantage of enabling different types of diffuser member to be used on the device, or of enabling the diffusing member to be replaced when worn.

According to another aspect of the invention, there is provided a diffused lighting apparatus, the apparatus comprising a collapsible light diffusing device as defined above, and a light source arranged in use adjacent said first aperture when the housing is in the unfolded condition thereof.

A preferred embodiment of the invention will now be described, by way of example only and not in any limitative sense, with reference to the accompanying drawings, in which:

FIG. 7 is a schematic plan view of the light diffusing device of FIG. 1 in a partially folded condition;

FIG. 8 is a side view of the diffused lighting apparatus of FIG. 2 in a folded condition;

FIG. 9 is a rear view of the diffused lighting apparatus of FIG. 2 in a folded condition;

Figure 2:
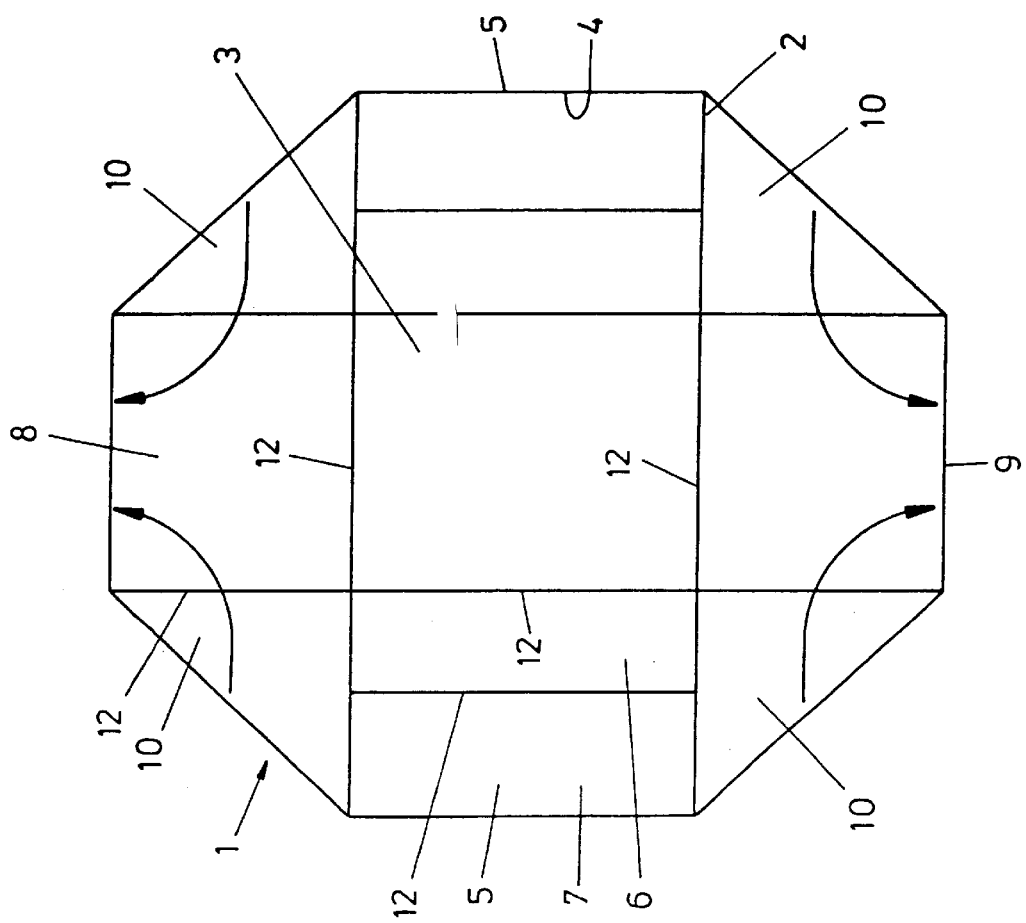
FIG. 2 is a front view of a diffused lighting apparatus embodying the present invention.
Figure 1:
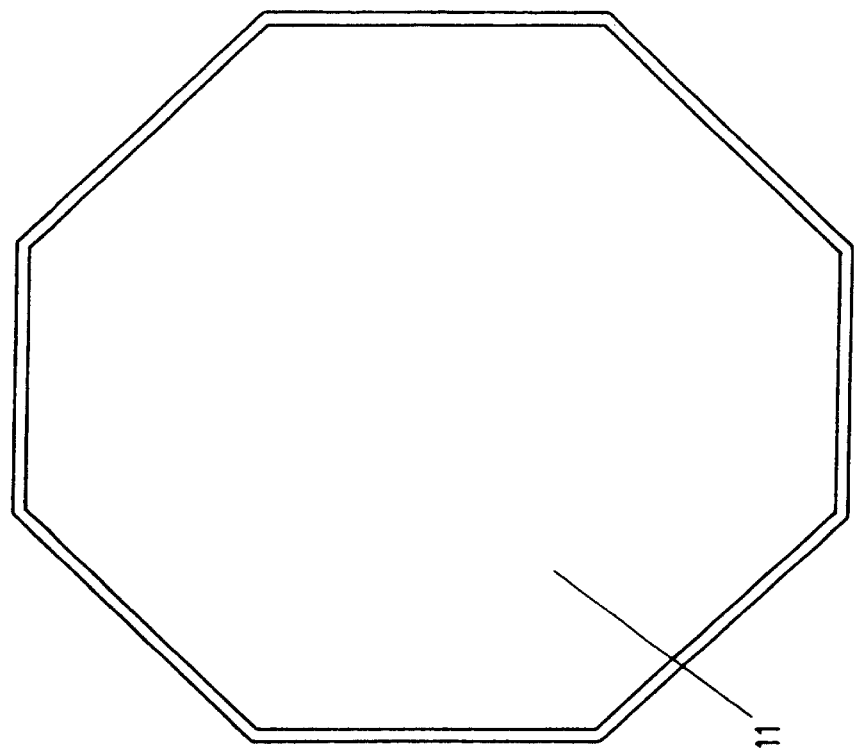
FIG. 1 is a front view of a housing of a light diffusing device embodying the present invention.

Referring to FIG. 1, a light diffuser 1 comprises a housing 2 formed of hinged panels of heat resistant material such as carbon fiber composite or aluminium to enable the housing 2 to be hinged between folded and unfolded conditions thereof. The panels preferably have a polished mirror surface to minimize the amount of light absorbed by the panels, which causes undesirable light loss and heating of the panels. In its unfolded condition, as shown in FIG. 1, the housing defines a generally rectangular aperture 3 at the rear end of the housing as shown in FIGS. 1 and 2, and a larger, generally octagonal, aperture 4 at the front end of the housing. In the unfolded condition, the housing is generally closed, in the sense that the gaps between adjacent panels are made as small as possible to minimize the amount of uncontrolled light passing out of the housing 2, other than via the light diffusing member 11.

The housing 2 comprises a pair of side panels 5, each of which is formed from an inner panel member 6 hinged to one side of the rectangular aperture 3, and an outer panel member 7 hinged to the inner panel member 6. A generally rectangular upper panel 8 and lower panel 9 are hinged respectively to the upper and lower sides of the rectangular aperture 3. Two generally triangular corner panels 10 are hinged to each of the upper 8 and lower 9 panels such that each corner panel 10 is only hinged along one of its sides, and such that a corner panel 10 is arranged between each pair of adjacent rectangular panels 5, 8, 9.

In the folded condition, the inner panel members 6 lie closest to the rectangular aperture 3, each corner panel 10 is folded against the upper 8 or lower 9 panel, and the upper 8 and lower 9 panels overlie the folded side panels 5, such that all of the panels overlie the rectangular aperture 3.

The octagonal aperture 4 is covered in use by a flexible light diffusing member 11 of fabric material. The light diffusing member is semi-permanently attached to the top and bottom panels 8, 9 and to two oppositely arranged corner panels 10, and can be attached to the remaining panels 5, 10 in the unfolded state of the housing 2 by means of suitable means such as a hook and loop system or spring clips. By "semi-permanent" is meant an attachment in which the light diffusing member 11 is usually attached to the housing 2 in the folded condition thereof, but can easily be removed from the housing when it becomes worn and needs to be replaced.

Figure 4:
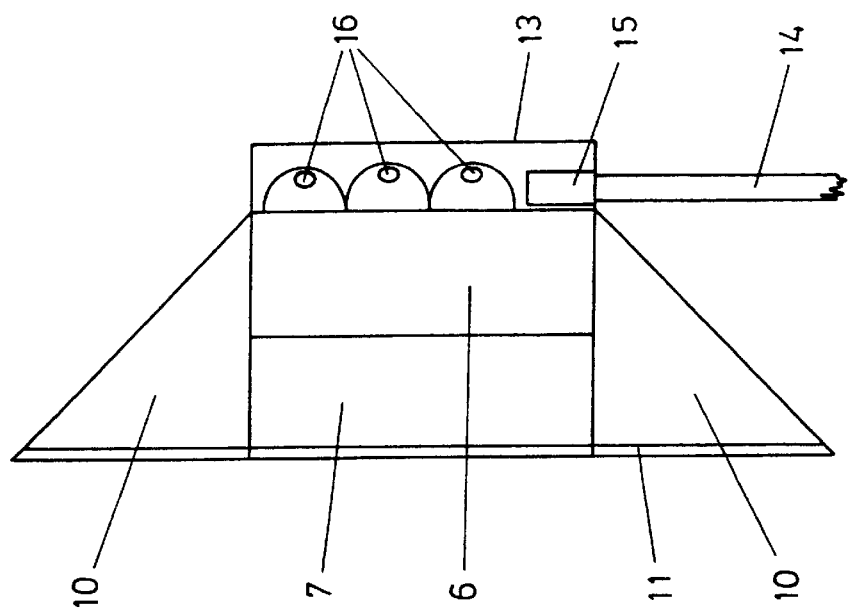
FIG. 4 is a cross-section elevational view of the diffused lighting apparatus of FIG. 2.
Figure 3:
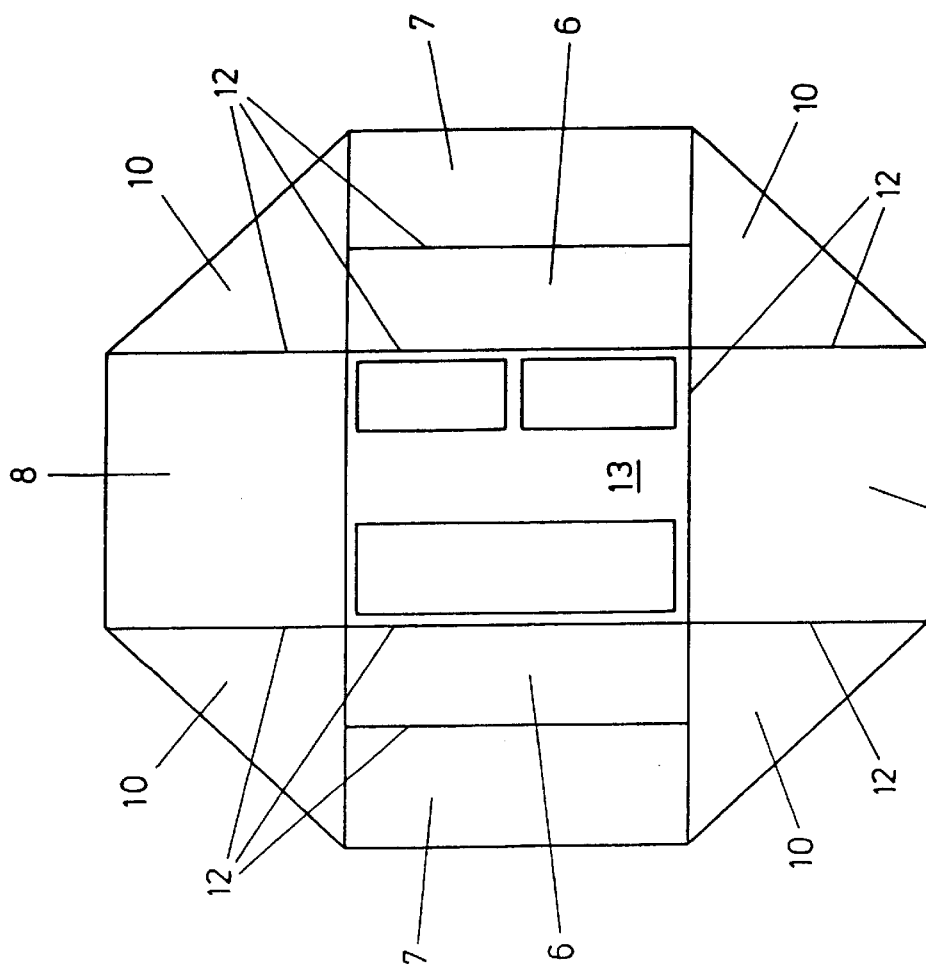
FIG. 3 is a rear view of the diffused lighting apparatus of FIG. 2.

As shown in FIG. 3, the panels 5, 8, 9, 10 are pivotable relative to each other about hinges 12 to move between the folded and unfolded conditions of the housing 2. Referring now to FIG. 4, a lam body 13 is mounted to a stand 14 by means of a socket 15. The lamp body 13 contains three lamp units 16 and the housing 2 is mounted to the lamp body 13 to enable the lamp units 16 emit light through the rectangular aperture 3 shown in FIG. 1 into the housing 2 towards the diffuser member 11 covering the octagonal aperture 4.

Figure 6:
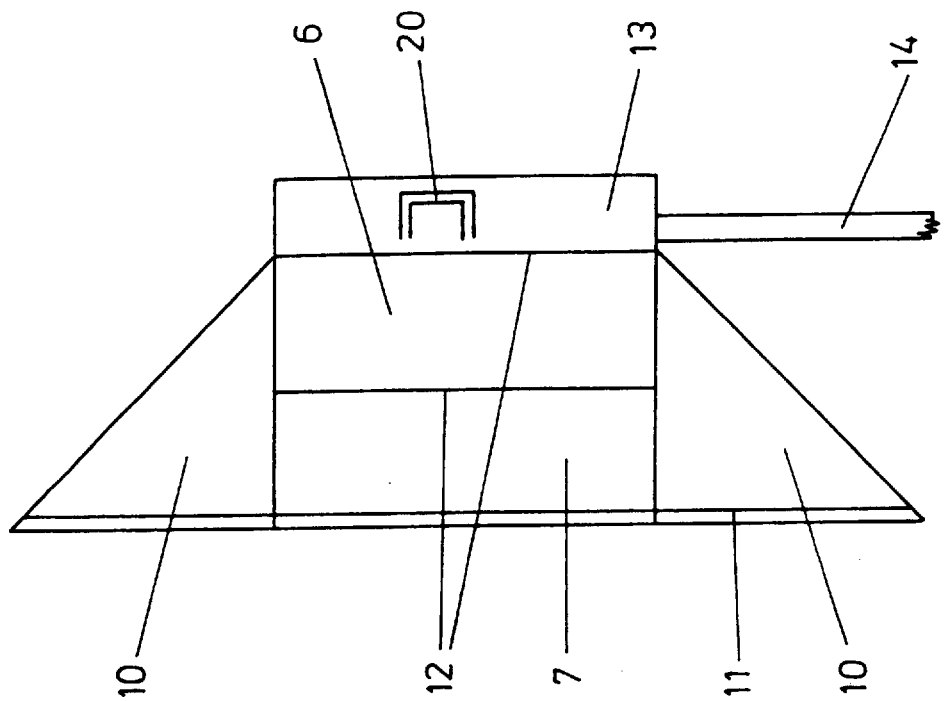
FIG. 6 is a side view, corresponding to FIG. 4, of the diffused lighting apparatus of FIG. 2.
Figure 5:
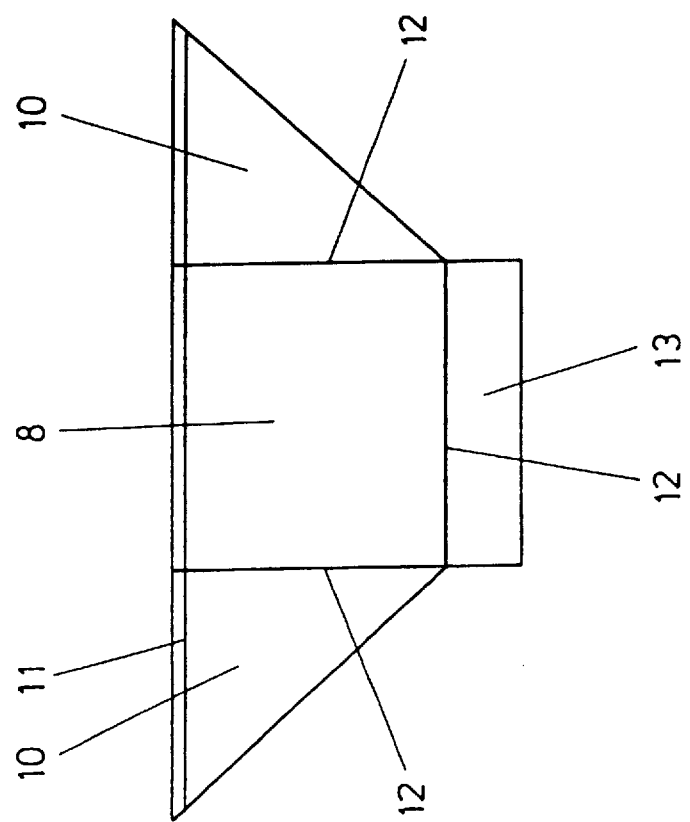
FIG. 5 is a plan view of the diffused lighting apparatus of FIG. 2.

The lamp body 13 is provided in its rear surface with a compartment having a door 17. The compartment houses a power supply lead for the lamp units 16 and control switches therefor. A further compartment having a door 18 accommodates spare lamp bulbs, etc, and a larger compartment having a door 19 accommodates various accessories such as colored gels to be placed over the diffuser member 11 for color correction of the diffused light source and/or a light control grid, as will be familiar to persons skilled in the art. Finally, as shown in FIG. 6, a handle 20 is provided on one or both sides of the housing 2 to enable the light source to be manipulated.

Figure 11:
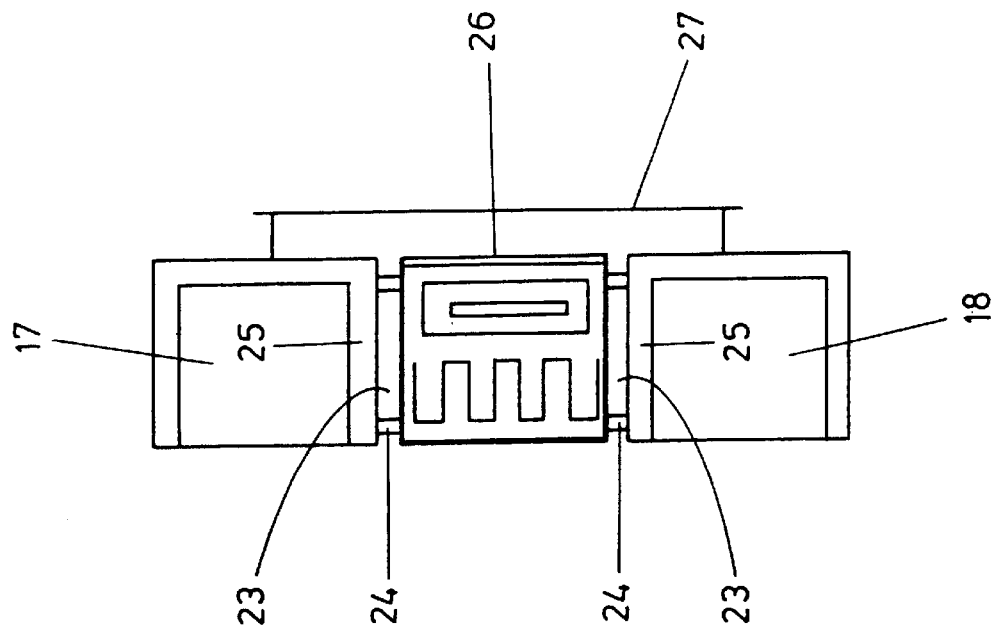
FIG. 11 is a cross sectional plan view of the apparatus of FIG. 10.
Figure 10:
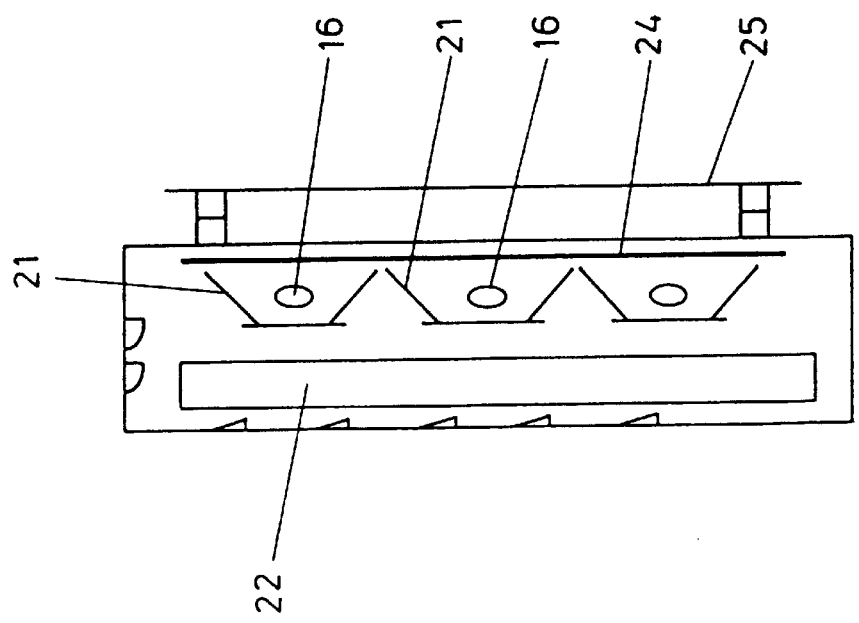
FIG. 10 is a cross sectional elevation view of the apparatus of FIG. 8.

A shown in greater detail in FIGS. 10 and 11, the lamp body 13 contains a respective reflector 21 associated with each of the lamp units 16. The reflectors 21 are each made from a dichroic "cold mirror" which reflects visible light but allows heat to pass through, minimizing the amount of heat directed to the front of the lamp where heat sensitive color correction and diffusion components are situated. Behind the reflectors 21 are convectors 22, typically made from aluminium, which create a chimney effect to dissipate heat. The heat dissipation chamber is insulated by means of air gaps 23 and thermal breaks 24 from the storage compartments 17, 18 and those parts of the lamp body 13 normally handled in use to reduce unwanted heating. The storage compartments 17, 18 are also provided with insulation 25 on the insides thereof.

A safety glass 26 and/or a safety wire mesh is provided between the lamps 16 and gel frame 27 which folds out from the lamp body 13. The safety glass 26 is typically in the form of a dichroic "hot mirror" which allows visible light to pass but reflects heat, to further control undesirable transfer of heat to the front of the apparatus.

The operation of the diffused lighting apparatus shown in the Figures will now be described.

In its folded condition, the lighting apparatus is in the form of a compact box of generally rectangular cross-section, as shown in FIG. 8. The lamp body 13 is then lifted by means of handles 20 to be mounted to the stand 14.

In order to unfold the apparatus into its unfolded condition to create a relatively large diffused lighting apparatus, upper 8 and lower 9 panels are unfolded about hinges 12 from their position overlying the rectangular aperture 3 and the side panels 5 are pivoted outwards as shown in FIG. 7. The corner panels 10 then pivoted from their positions in which they overlie the upper 8 or lower panel 9 to form the housing 2 of generally octagonal transverse cross-section. The flexible light diffusing member 11 is then secured to the panels to which it is not semi-permanently attached to entirely cover the front aperture 4.

It will be appreciated by persons skilled in the art that the above embodiment has been described by way of example only, and not in any limitative sense, and that various alterations and modifications are possible without departure from the scope of the invention as defined by the appended Claims. For example, the invention may in one aspect be in the form of a diffused lighting apparatus in which the lamp body 13 is integral with the housing 2 of the light diffuser 1. Alternatively, the invention may in another aspect be in the form of a separable light diffusing device for mounting to a conventional light source to form a diffused lighting apparatus. In addition, although the above embodiment has been described as having a housing having an octagonal cross section in the unfolded condition, it will be appreciated by persons skilled in the art that the housing may be produced in other shapes.

What is claimed is:

1. A diffused lighting device, comprising:
    a collapsible housing having a folded collapsed and an unfolded operating conditions, said housing in said unfolded operating condition defining and enclosing a three dimensional area having a first aperture at a first end thereof and a second aperture at a second end thereof, said second aperture being larger than said first aperture;
    a flexible diffusing member adapted to cover the second aperture when the housing is in the unfolded operating condition thereof;
    wherein the housing comprises a plurality of substantially rigid panels of heat resistant material, a first portion of said panels being pivotally attached at an inner edge thereof to the periphery of said first aperture, wherein at least one of said first portion of panels has at least one of a second portion of said panels being pivotally attached thereto to enable the housing to change between said folded collapsed and unfolded operating conditions, wherein the periphery of said second aperture is formed at least in part by outer edges of a plurality of said panels, said second aperture having a largest dimension defined by the greatest distance between two of said outer edges forming said second aperture when said housing is in said unfolded operating condition, wherein the dimensions of said housing in said folded collapsed condition are less than the largest dimension of said second aperture when said housing is in the unfolded operating condition and the dimensions of said first aperture are substantially the same when said housing is in the folded and unfolded conditions, and at least one of said first portion of panels may pivot independently of at least one other of said first portion of panels.

2. A device according to claim 1, wherein the housing between the first and second apertures is substantially light-proof when in the unfolded condition thereof.

3. A device according to claim 1, wherein inside surfaces of said housing when in said unfolded operating condition are mirror finished to minimize light loss.

4. A device according to claim 1, wherein at least one said panel is located between the flexible light diffusing member and components defining the first aperture when the housing is in the folded condition thereof.

5. A device according to claim 1, wherein the housing has a substantially polygonal transverse cross-section in the unfolded condition thereof.

6. A device according to claim 5, wherein the housing has a substantially octagonal cross-section in the unfolded condition thereof.

7. A device according to claim 1, wherein the first aperture is substantially rectangular.

8. A device according to claim 1, wherein said panels are made from a carbon fiber composite.

9. A device according to claim 1, wherein said panels are made of metal.

10. A device according to claim 1, wherein each said panel is provided with a light reflecting surface.

11. A device according to claim 1, wherein the diffusing member is formed substantially of fabric.

12. A device according to claim 1, wherein the diffusing member is removably mounted to the housing.

13. The device of claim 1, wherein said panels comprise more than one rigid piece pivotally connected to one another.

14. A diffused lighting device, comprising:
    a collapsible housing having a folded collapsed and an unfolded operating conditions, the housing in said unfolded operating condition defining and enclosing a three dimensional area having a first aperture at a first end thereof and a second aperture at a second end thereof, said second aperture being larger than said first aperture;
    a flexible diffusing member adapted to cover the second aperture when the housing is in the unfolded operating condition thereof;
    wherein the housing comprises a plurality of substantially rigid panels of heat resistant material, a first portion of said panels having inner and outer edges and being hinged at said inner edge thereof to the periphery of said first aperture to enable the housing to change between said folded and unfolded conditions, wherein the periphery of said second aperture comprises edges of a plurality of said panels such that the dimensions of said housing in said folded condition are less then the major dimension of said second aperture and the dimensions of the first aperture are substantially the same in the folded and unfolded conditions; and wherein the housing further comprises four substantially rectangular panels, each of which is hinged to a respective side of said first aperture, and four substantially triangular panels, each triangular panel having a top edge and two side edges and arranged so that its side edges are between a respective pair of adjacent rectangular panels in the unfolded operating condition of the housing, and wherein each said triangular panel is hinged along at least one side edge thereof to a respective rectangular panel.

15. A device according to claim 14, wherein two said rectangular panels are each foldable in half and are arranged on opposite sides of said first aperture.

16. A collapsible light diffusing device, comprising:

a collapsible housing having a folded collapsed condition and an unfolded operating conditions, said housing in its operating condition defining a three dimensional enclosed area having a first aperture and a second aperture, said housing comprising a plurality of substantially rigid first panels and a plurality of substantially rigid second panels, said first panels being pivotally attached to the periphery of said first aperture, wherein at least one of said first panels may pivot independently of at least one of the other of said first panels to change said housing into its collapsed condition from thee operating condition or to change said housing from it its collapsed condition to its operating condition, and said first panels can be folded over said first aperture when said housing is in its folded collapsed condition to at least partially cover said first aperture;

wherein when said housing is in said operating condition said first aperture is smaller than said second aperture, and said first aperture is adapted to be mounted to a light source such that said first aperture is nearer to the light source than said second aperture;

said device further comprising a flexible light diffusing member adapted to cover the second aperture formed when the housing is in the unfolded operating condition; and wherein the dimensions of the first aperture are substantially the same in the folded collapsed and unfolded operating conditions.

17. The device of claim 16, wherein said first aperture has a first largest dimension, and said housing in the folded collapsed condition has a second largest dimension, wherein said second largest dimension approximately equals said first largest dimension.

18. The device of claim 16, wherein said first panels have four edges including a first edge, a second edge, and two side edges, said first edge being opposite from said second edge, and side edges being between said first and second edges, wherein said first edge is pivotally attached to said first aperture, and second aperture comprises said second edges of said first panels.

* * * * *